United States Patent [19]

Gauron

[11] Patent Number: 4,902,180
[45] Date of Patent: Feb. 20, 1990

[54] INSET PANEL FASTENER

[76] Inventor: Richard F. Gauron, 26020 SE. 158th, Issaquah, Wash. 98027

[21] Appl. No.: 290,519

[22] Filed: Dec. 27, 1988

Related U.S. Application Data

[62] Division of Ser. No. 946,515, Dec. 22, 1986, Pat. No. 4,812,193.

[51] Int. Cl.$^4$ .......................... F16B 39/02; E04B 1/38
[52] U.S. Cl. ..................... 411/82; 411/258; 52/704
[58] Field of Search ............... 411/82, 69, 180, 178, 411/258, 257; 52/698, 704

[56] References Cited

U.S. PATENT DOCUMENTS

| | | | |
|---|---|---|---|
| 1,045,562 | 11/1912 | Kennedy | 411/82 |
| 2,880,830 | 4/1959 | Rohe | 189/34 |
| 3,016,578 | 1/1962 | Rohe | 18/59 |
| 3,019,865 | 2/1962 | Rohe | 189/34 |
| 3,271,498 | 9/1966 | Rohe et al. | 264/261 |
| 3,282,015 | 11/1966 | Rohe et al. | 411/258 |
| 3,510,916 | 5/1970 | Phelan | 249/97 |
| 3,564,798 | 2/1971 | Darby et al. | 411/82 |
| 3,646,981 | 3/1972 | Barnes | 411/82 |
| 3,884,006 | 5/1975 | Dietlein | 411/82 |
| 4,149,350 | 4/1979 | Fischer et al. | 52/704 |
| 4,341,053 | 7/1982 | Dettfurth et al. | 411/82 |
| 4,420,354 | 12/1983 | Gougeon et al. | 156/293 |
| 4,554,196 | 11/1985 | Meeker | 411/82 |

FOREIGN PATENT DOCUMENTS

| | | |
|---|---|---|
| 2113807 | 2/1973 | Fed. Rep. of Germany . |
| 2515950 | 10/1976 | Fed. Rep. of Germany . |
| 2836835 | 3/1980 | Fed. Rep. of Germany ........ 411/82 |

*Primary Examiner*—Neill R. Wilson
*Attorney, Agent, or Firm*—Joan H. Pauly; Delbert J. Barnard

[57] ABSTRACT

A fastener element is ejection molded from an engineering resin of a type that will bond to potting resin used for securing the fastener element within a cavity formed within a panel of composite material. The fastener element includes flow control disks spaced apart along a stem portion between end portions. Flats are formed on opposite sides of the flow control disks, below fill and vent openings. Resin introduced into the fill hole travels down to the bottom of the cavity and around the fastener element and fills the cavity from the bottom up, so that the presence of resin at the vent opening will indicate that the cavity has been filled with resin and does not include an airspace or void.

9 Claims, 4 Drawing Sheets

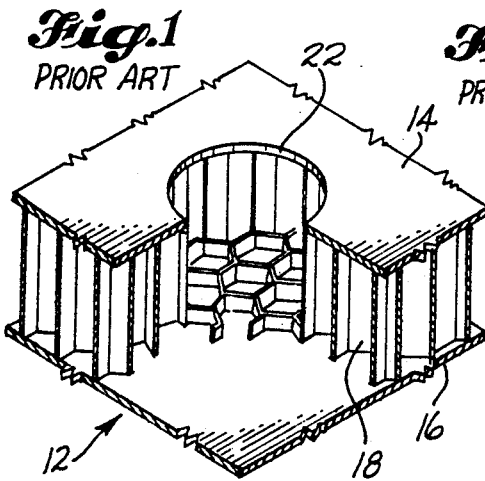
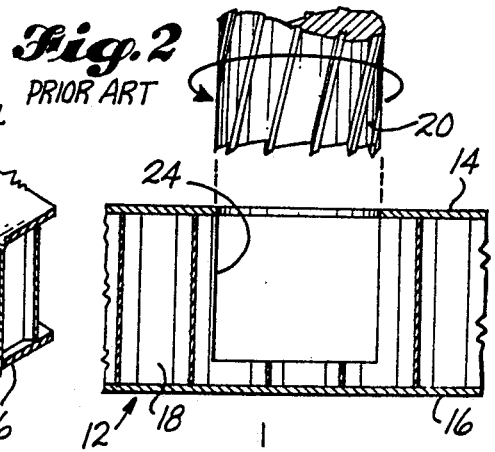
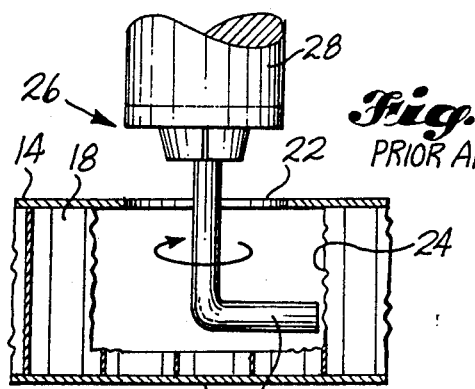
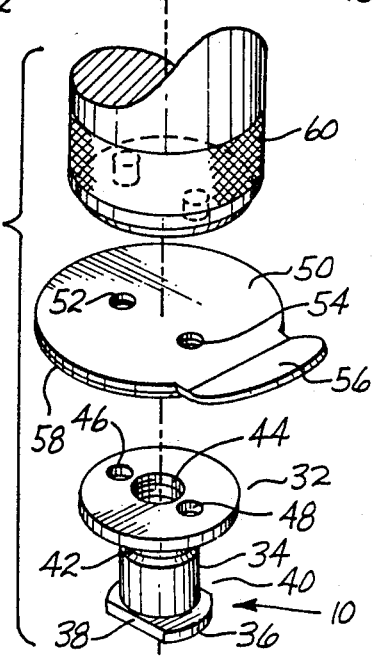
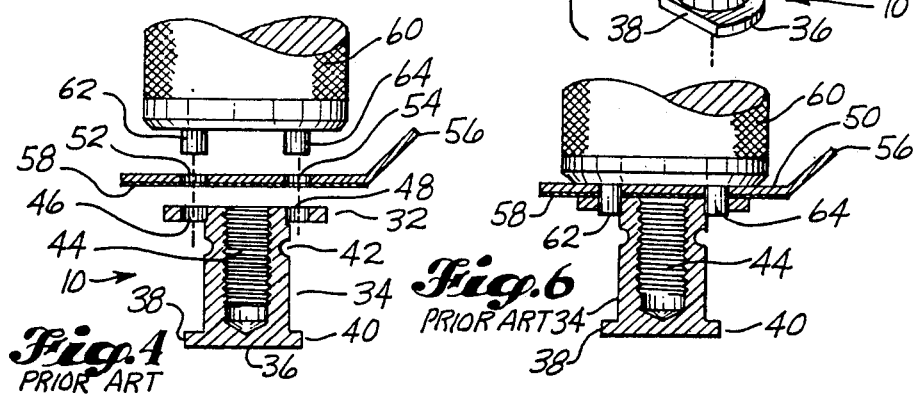

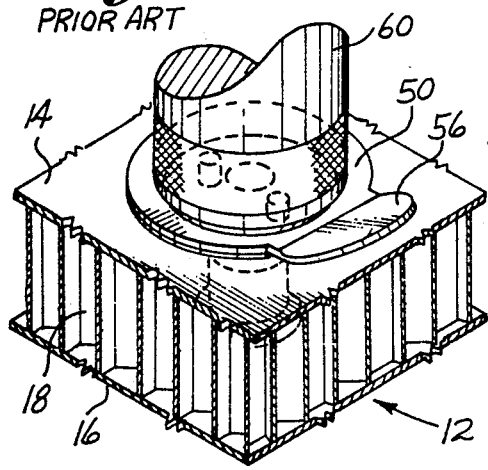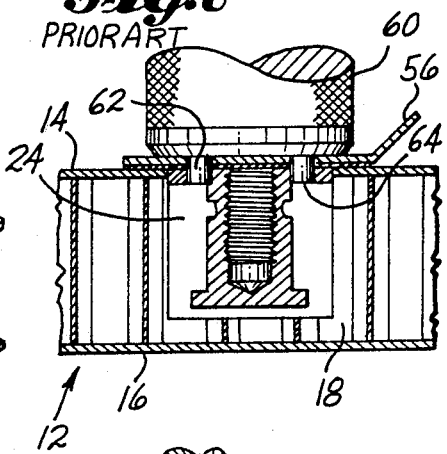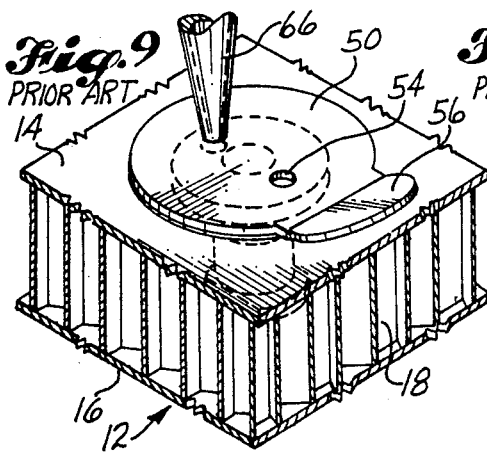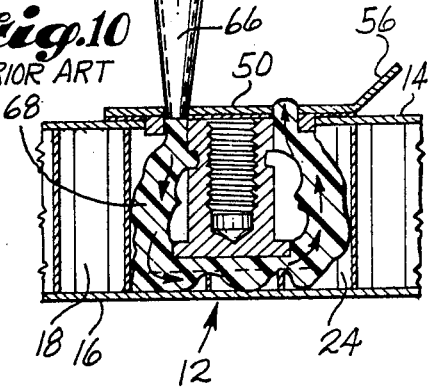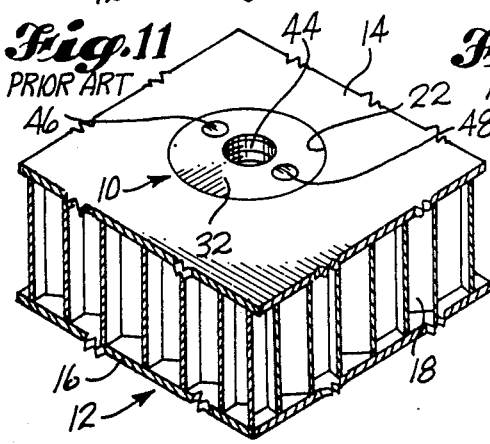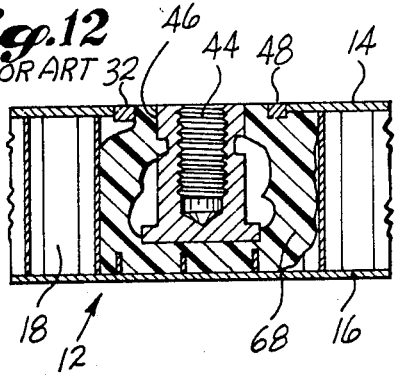

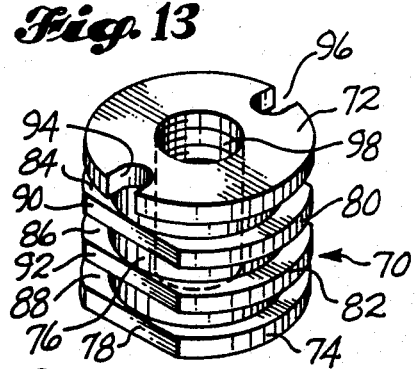
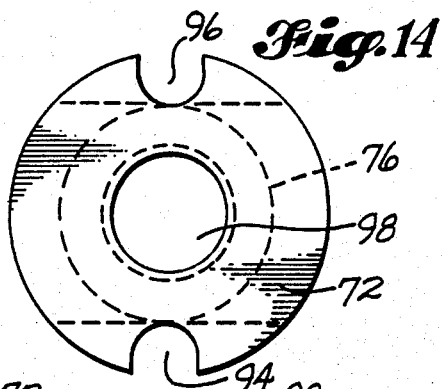
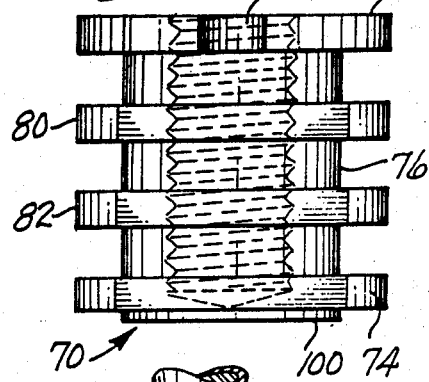
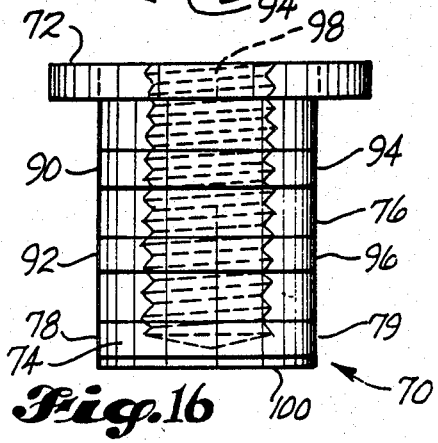
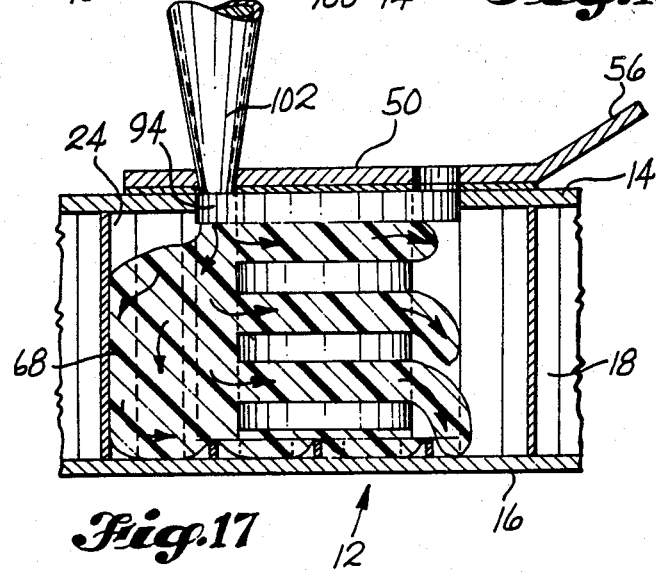

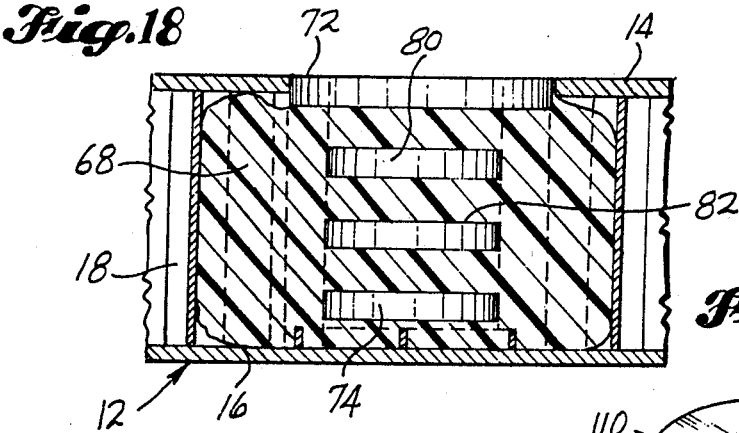
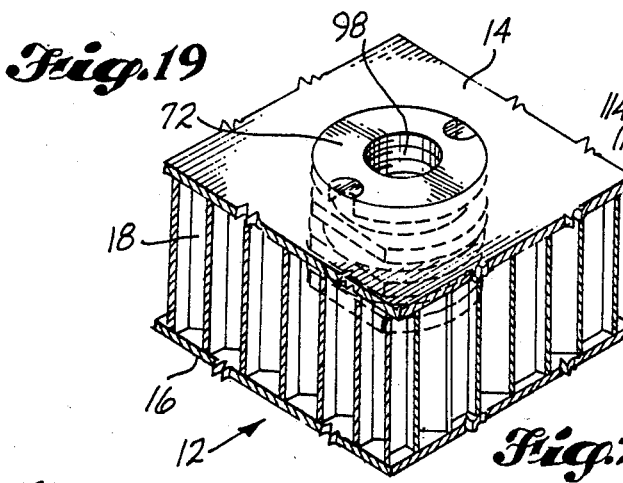
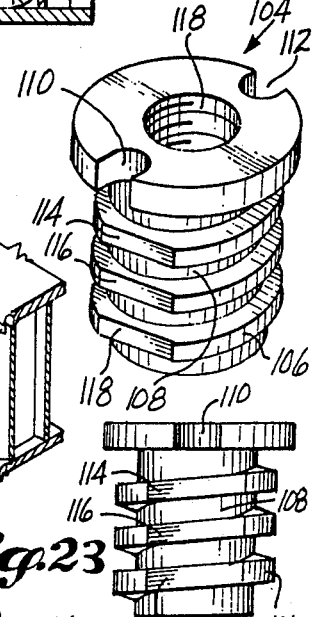
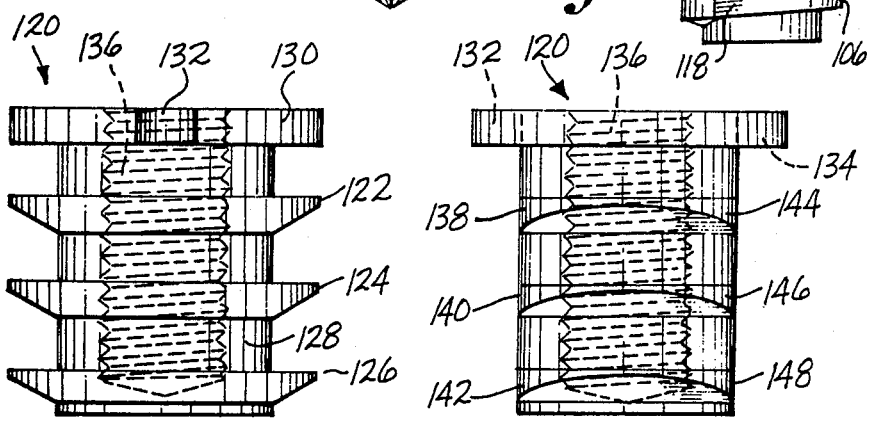

INSET PANEL FASTENER

This application is a division of application Ser. No. 946,515, filed Dec. 22, 1986, now U.S. Pat. No. 4,812,193.

DESCRIPTION

1. Technical Field

This invention relates to inset fastener elements for sandwich structures. More particularly, it relates to the provision of an improved inset fastener element and an installation method for use with sandwich panels constructed from composite materials.

2. Background Art

A sandwich panel combines high strength, inherent rigidity and minimum weight. For this reason it is used extensively in the aircraft industry. Of primary importance to successful utilization of a sandwich panel is the method of transmitting loads into and out of it. By their very nature, sandwich panels cannot carry concentrated unit loading. Fastener inserts have been developed for use with these panels. The present invention relates to improvements in molded-in type fastener inserts.

A prior art insert and a prior method of installing such insert have been illustrated and will be hereinafter described. Such prior art fastener element is typical of the fastener elements which have heretofore been used with both sandwich panels constructed of metal and sandwich panels constructed from composite material A problem with the prior art insert is that it is constructed from a metal and the resin used for securing it within the sandwich panel does not bond to the metal. As a result, the fastener element is only held in place by a mechanical interlock which is formed between the resin and flange portions of the fastener element. Owing to the construction of the prior art fastener elements, often times air spaces or voids are formed in the potting resin, producing a weakened connection.

The principal object of the present invention is to provide an improved fastener element and a method of installing such fastener element which will result in a stronger connection of the fastener element to the sandwich panel and an elimination or reduction in size of airspaces or voids in the potting resin.

DISCLOSURE OF THE INVENTION

In accordance with the present invention, a fastener element is provided which is injection molded from an engineering resin of a type that will make a cohesive bond with the potting resin. Such fastener element comprises an outer end disk sized to be snugly received within a skin opening. A stem projects inwardly from the outer end disk, into a cavity formed in the panel which has a diameter larger than the diameter of the skin opening. The stem is substantially smaller in diameter than the outer end disk. The fastener element includes flow control disks extending about the stem. Flow passageways are by and between the disk and between the outer end disk and the flow control disks. The disks are formed to include flat surfaces on diametrically opposed sides of the fastener element. The flat surfaces are located in planes which are spaced radially inwardly from the periphery of the outer end disk. On one side of the fastener element a resin receiving fill opening is formed in a peripheral portion of the end disk, generally in line with a region in a formed cavity between the flats and the adjoining side of the cavity. A vent opening is formed in a second peripheral portion of the end disk that is spaced diametrically across the fastener element from the fill opening. The vent opening is in alignment with a second cavity region formed between flats on the vent opening side of the fastener element and an adjoining sidewall of the cavity.

The fastener element is set into the cavity with the end disk substantially flush with the skin of the panel. Potting resin is introduced into the fill opening. Owing to the construction of the fastener element, the potting resin first substantially fills the region of the cavity which is inwardly of the fill opening and laterally between the rib flats on the fill opening side of the fastener element and the adjoining sidewall of the cavity. The resin then flows around the fastener element and through the avenues between the disks. These avenues cause the potting resin to flow into all parts of the cavity region defined inwardly of the vent opening. The entire cavity is essentially full of resin before resin shows at the vent opening.

The flats help define cavity regions through which the potting resin will readily flow, and provided a substantial area to resist turning of the fastener element relative to the potting material and the sandwich panel. The spaces between the disks define avenues for evenly distributing the potting resin around the fastener element, and for directing it into all required portions of the cavity region inwardly of the vent opening, to either prevent or minimize the formation of airspaces or voids in the potting resin. The disk and flow avenues further provide a superior mechanical interlock between the fastener element and the potting resin, functioning together with the bonding that occurs between the potting resin and the fastener element resin, for securing the fastener element in place and enabling it to withstand loads of a magnitude which would pull the prior art fasteners out from the sandwich panel.

These and other features, advantages and characteristics of the invention will be apparent from the various embodiments of the invention which are illustrated and described below in connection with the drawing

BRIEF DESCRIPTION OF THE DRAWING

Like reference numerals are used to designate like parts throughout the several views of the drawing, and:

FIG. 1 is a fragmentary isometric view of a honeycomb panel, with a foreground quarter section removed, for clarity of illustration, such view showing a blind opening that has been drilled down into the panel;

FIG. 2 is a fragmentary sectional view, showing a cutter element being withdrawn from the opening;

FIG. 3 is a view like FIG. 2, showing the use of a tool for routing out core material for the purpose of forming an enlarged cavity inwardly of the entrance portion of the opening;

FIG. 4 is an exploded side elevational view of a prior art fastener element and an installation tool with the fastener element shown in sections;

FIG. 5 is an exploded isometric view of the prior art fastener element and installation tool;

FIG. 6 is an assembled side elevational view of the prior art fastener element and installation tool;

FIG. 7 is an isometric view of a fragment of a panel, showing the installation tool being used for installing the prior art fastener element;

FIG. 8 a side elevational view of the assembly shown by FIG. 7, with parts shown in section;

FIG. 9 is a view like FIG. 7, showing a resin material being introduced into the enlarged cavity;

FIG. 10 is a view like FIG. 8, showing the resin being introduced into the enlarged cavity;

FIG. 11 is a view like FIG. 7 and 9, following completion of the installation of the fastener elements;

FIG. 12 is a view like FIGS. 8 and 10, following installation of the fastener element;

FIG. 13 is an isometric view of a first embodiment of fastener element constructed according to the present invention;

FIG. 14 is a top plan view of the fastener element shown by FIG. 13;

FIG. 15 is a side elevational view of the fastener elements shown by FIGS. 13 and 14;

FIG. 16 is a second side elevational view of the fastener element shown by FIGS. 13–15, showing a side spaced 90° from the side shown by FIG. 15;

FIG. 17 is a view like FIG. 10, but showing the fastener element of FIGS. 13–16;

FIG. 18 is a view like FIG. 12, but showing the fastener elements of FIGS. 13–17;

FIG. 19 is a view like FIG. 11, but showing the fastener element of FIGS. 13–18;

FIG. 20 is an isometric view of a second embodiment of fastener constructed according to the present invention, such fastener element having a single helical rib;

FIG. 21 is a side elvational view of a third embodiment of fastener element;

FIG. 22 is a side elevational view of the embodiment shown by FIG. 21, looking towards a side that is spaced 90° from the side shown by FIG. 21;

FIG. 23 is a side elevational view of the helical rib embodiment shown by FIG. 20, looking towards one of the sides which includes flats.

BEST MODE FOR CARRYING OUT THE INVENTION

FIGS. 1–12 illustrate a prior art fastener element 10 and a prior art method of installing such fastener element 10. For example purposes, a threaded blind opening fastener has been illustrated, of a type manufactured by the Shur-Lok Corporation of 1300 East Normandy Pl. Santa Ana, Calif. 92711, series SL601. It comes several sizes and is constructed from aluminum, steel or CRES. The panel is known as a "sandwich panel." The present invention is concerned with installing a fastener element into a sandwich panel 12 constructed from composite materials. It comprises opposite surface forming skins 14, constructed from a suitable engineering plastic (e.g. fiberglass) and a honeycomb core 18 constructed from a plastic or treated paper (e.g. Nomex). As is well-known, the skin layers 14, 6 are resin bonded to the core material 18. It is known to mold an aluminum fastener element 10 into a panel 12 constructed from composite materials. This known technique will now be described, with reference to FIGS. 1–12.

A cutting bit 20 is used to cut an opening through first one skin 14 and then most of the core 18. Of course, if a through type fastener element is used, the opening will be cut through the entire panel 12.

In FIGS. 1 and 2, the opening through the skin member 14 has been designated 22. The opening or cavity formed in the core 18 has been designated 24. Following formation of openings 22, 24, a reaming tool 26 is used for enlarging the opening 24. Tool 26 may comprise a rotary chuck 28 and a reamer 30 secured in and rotated by the chuck 28. As shown by FIG. 3, the tool 26 is used to enlarge the opening 24 until it has a diameter substantially larger than the diameter of opening 22.

Fastener element 10 has an outer end portion 32 which is disk shaped and is substantially equal in diameter to the opening 22. Fastener element 10 also comprises a stem 34 which is substantially smaller in diameter than outer end portion 32 and further includes an inner end portion 36. End portion 36 is substantially equal in diameter to end portion 32 but is formed to include flats 38, 40 on diametrically opposite sides. These flats 38, 40 are referred to as antirotation flats. A girth groove 42 is formed in the stem 34 closely adjacent end portion 32. An internally threaded blind socket 44 extends axially into the insert 10. Two openings 46, 48 are formed in the end portion 32, outwardly of the stem 34. Opening 46 is a "fill" opening and opening 48 is a "vent" opening.

The installation of the fastener element 10 will now be described. A positioning tab 50 is provided which includes a main body portion that is larger than the opening 22. Tab 50 includes openings 52, 54 which correspond in size and spacing to the openings 46, 48. Tab 50 is provided with a handle 56 and an adhesive layer 58 on one side. The tab 50 comes with a paper backing for protecting the adhesive layer 58. This paper backing is removed and the tab 50 is positioned on a guide tool 60. Guide tool 60 includes a pair of projections 62, 64 sized and spaced to extend through the openings 52, 56. The fastener element 10 is then installed on the tool 60, with the projections 62, 64 extending through the openings 46, 48. The fastener element 10 is pressed against the adhesive layer 58. Next, the fastener element 10 is positioned within the cavity 24 (FIG. 7 and 8). Downward pressure is applied on the tab 50 for the purpose of creating an adhesive bond between the adhesive layer 58 and the upper surface portion of skin 14 immediately surrounding opening 22. Then, the tool 60 is removed, leaving tab 50 connected to skin 14 and fastener element 10 connected to tab 50. Next, the nozzle 66 of a sealant gun is brought into registry with openings 52, 46. An epoxy potting material 68 is injected through these openings into the cavity 24. Air within cavity 24 is displaced out through openings 48, 54 as epoxy is introduced into the cavity 24. In theory, the appearance of epoxy 68 at the openings 48, 54 tells the workman that the cavity 24 has been filled. In actual practice, owing to the construction of the fastener element 10, epoxy 68 may flow about the upper portion of stem 34, from fill openings 52, 48 to vent openings 48, 54, before the lower portion of cavity 24, on the side thereof opposite the fill openings 52, 46, has received epoxy 68. And/or air bubbles will form around the fastener and hold the resin away from the fastener. Voids of this type are shown in FIGS. 10 and 12. This results in an inadequate anchoring of the fastening element 10 within the cavity 24, as will be described some more below.

The workman is trained to discontinue ejecting epoxy 68 as soon as he sees epoxy at the vent openings 54, 48. He removes the nozzle 66 and also removes the tab 50. Adhesive 58 is a pressure type adhesive which will adequately connect the tab 50 to the fastener element 10 and the skin member 14, during the installation process, but will readily separate from the skin member 14 and end portion 32 by the workman pulling on handle 56 to peel the tab 50 away from the members 14, 32.

As previously mentioned, the fastener insert may be a through type insert In that case a second opening is formed in the skin member 16 to receive a second end portion which is snugly received within such opening. In other respects, the installation technique is the same as has been illustrated and described. An enlarged cavity is formed in the core material 18 and epoxy 68 is introduced into the cavity, between its sidewall and the stem portion of the fastener element The prior art practice of installing an insert in a sandwich panel of composite material has always involved the use of a metal insert. The illustrated insert 10 is a typical configuration. In other words, the insert has a generally spool configuration, and includes enlarged ends and a smaller diameter stem between the ends. Structural tests conducted with respect to these fasteners has indicated that the fastener element is held in place only by a mechanical interlock. In other words, the epoxy that enters into the annular zone surrounding the stem 34, between the end members 32, 36, provides a mechanical interlock for resisting a pulling out of the fastener element 10. The tests have indicated that this type of structural interlock is often times ineffective, particularly in those cases where an airspace or void has resulted in the cavity 24.

In accordance with the present invention, the fastener element is constructed from an engineering plastic of a type to which the resin 68 will cohesively bond. The resin 68 becomes cohesively bonded to the skin members 14, 16 and may also be cohesively bonded to the core material 18. The construction of the fastener insert from a resin compatible to resin 68 results in a true molding-in of the fastener element. Further, the fastener elements of the present invention are constructed in a manner resulting in an elimination or substantial reduction in size of any void region in the cavity 24. The fastener elements are also constructed to provide substantial surfaces for resisting rotation of the insert relative to the panel 12.

Referring to FIGS. 13-19, the fastener insert 70 shown by these figures is molded from an engineering resin. By way of example, a poly (amide-imide) molding resin may be used of a type manufactured by Amoco Chemicals Corporation of 200 East Randolph Drive, Chicago, Ill. 60601. This particular resin is a reaction product of trimellitic nahydride and aromatic diamines. It is called amide-imide because the polymer chain comprises amide linkages alternating with imide linkages. The manufacturer claims that (1) the combination of aromatic groups and imide linkages are responsible for the polymer's exceptional thermal stability and (2) the amide groups impart flexibility and elongation, which results in an engineering plastic with exceptional toughness. This particular resin is sold under the trademark TORLON, which is a registered trademark of AMOCO Chemical Corporation.

Referring to FIGS. 13-16, fastener element 70 has a pair of end portions 72, 74, interconnected by a stem 76. Fastener element 70 is a blind threaded type fastener element. Its inner end portion 74 includes antirotation flats 78 on diametrically opposite sides. Flow control disks are provided on the stem 68, between the end portions 72, 74, and spaces or flow passageways are formed between adjacent flow control disks and between the end flow control disks and the end portions 72, 74. In the embodiments shown by FIGS. 13-16, the flow control disks comprise circular ribs 80, 82 which extend about the girth of stem 76. The flow passageways are girth grooves 84, 86, 88. Disks 80, 82 are provided with flats 90, 92 on the same side of element 70 as flat 78, and flats 93, 95 on the same side of element 70 as flat 79. A fill opening 94 is provided in a peripheral part of end portion 72, generally in alignment with the side region of the element 70 laterally outwardly of the flats 90, 92, 78. Vent opening 96 is formed in end portion 72, diametrically opposite fill opening 94. Vent opening is in alignment with the side region of element 70 that is laterally outwardly of the flats 93, 95, 79. An internally threaded aligned central blind opening 98 enters the element 70 through end portion 72, and extends axially into the element 70.

As shown by FIGS. 13-16, the flats 90, 92, 78 and 93, 95, 79 may lie on chords which extend at a tangent to the stem 76.

As shown by FIGS. 15 and 16, a portion 100 of the stem 76 may extend below end member 74.

A positioning tab 50 and installation tool 60 are used for positioning fastener element 70 relative to the cavity 24 in panel 12 as previously described. Epoxy 68 is introduced in a nozzle 102 into the fill opening 94.

Owing to the construction of insert 70, the first resin 68 to enter through fill opening 94 will flow into a side region of cavity 24 outwardly bounding the flats 90, 92, 78. The surfaces of the end member 72, 74 and the disks 80, 82 will retard flow of the resin 68 around to the opposite side of insert 70 until a substantial amount of the resin 68 is accumulated in the introduction region. The flow passageways or spaces and the disks 80, 82 and end member 74 influence the flow around the fastener element 70. Enough pressure is developed in the introduction region to cause the resin 68 to flow faster around the lower portion of the fastener element 70 than it does about the upper portion of fastener element 70. As a result, this allows the vent opening 96 to function effectively and results in resin filling the region that outwardly bounds the flats 93, 95, 79 from the bottom up, so that resin does not appear at the vent opening 96 until the cavity 24 is in fact substantially full of resin.

The positioning of the flats 90, 92, 78 and 93, 95, 79 contributes to the flow control of the resin. They also function to provide a substantial amount of resistance to rotation. Prior art fastener elements include a single pair of antirotation flats at the lower end of the fastener element. The fastener element of the present invention includes four additional flats 90, 92, 93, 95, and further provides flow control of the resin. As stated above, the fastener element 70 is constructed from a resin material to which the resin 68 actually bonds. Tests have shown that the cohesive attraction between the resin and the fastener element 70 by itself resists the formation of air pockets or voids next to the fastener elements, 70. The presence of disks 80, 82 enhances the mechanical interlock between the fastener element 70 and the resin 68. This enhanced mechanical interlock and the bond between the materials provides a much improved connection of the fastener element 70 to the panel 12. In actual tests, the fastener element 70 was pulled upon until a failure occurred. The failure was in the panel 12 surrounding the body of resin 68, and not a mere mechanical interlock failure immediately surrounding the fastener element 70. The force required to cause such failure was considerably larger than the force required to cause the failure of the connection of the prior art fastener 10 to the panel 12. Also, the test disclosed that the void forming problem was essentially eliminated.

FIG. 20 shows a modified construction of the insert. The insert 104 shown by this figure comprises rib means in the form of a continuous helical rib 106, the turns of which form the function of disks 80, 82 and end portion 74, in the embodiment shown by FIGS. 13–19. A helical groove or space 108 is formed between the turns of the helical rib 106. This space 108 performs the function of the spaces between the disks 80, 82, between disks 80 and end member 72 and between disk 82 and end member 74. The turns of the helical rib 106 is formed to include flats in the regions below a fill opening 110 and below a vent opening 112. The flats 114, 116, 118 below the fill opening 110 are shown. Similar flats are provided on the opposite side of the fastener element 104, below the vent opening 112. Fastener element 104 is also a blind type fastener element. It includes an axially extending, internally threaded blind opening 118, for receiving the threaded portion of a bolt (not shown).

FIGS. 21, 22 show a fastener element 120 which is like fastener element 70 except that the under surface portions of the disks 122, 124 and the undersurface portion of the end portion 126 are slanted. Specifically, this surface rises at it extends outwardly from the stem 128. End portion 130 is like end portion 72 of fastener element 70. It includes a pair of diametrically opposed openings 132, 134, one of which is a fill opening and the other of which is a vent opening. It also includes an axially extending blind opening 136 for receiving the threaded portion of a bolt. Flats 138, 140, 142 are formed on the disks 122, 124 and end member 126, below opening 132. In similar fashion, on the opposite side of the fastener element 120, flats 144, 146, 148 are formed on the disks 138, 140 and on the end portion 142. This embodiment is installed in the same manner as the embodiment shown by FIGS. 13–19. The sloping surfaces function to help direct the resin to flow in the avenues below disks 122, 124 and below end member 126 more readily than in the groove between end member 130 and disk 122. The outwardly and upwardly sloping lower surfaces of the disks 122, 124 and end member 126 increase the sizes of the avenues for resin flow which are defined below the elements 122, 124, 126. FIG. 21 clearly shows that the forwardly and outwardly sloping lower surfaces of the disks 22, 124 makes the avenues below the disk 122, 124 larger in cross section than the avenue formed between disk 122 and end member 130. This construction and the head pressure on the resin being introduced into the cavity will encourage resin flow around the bottom and center portions of the fastener element 120 than about the top upper portion of fastener element 120 This results in a substantial filling of the cavity before resin shows at the vent opening 134.

Other changes in the construction of the insert can be made without departing from the basic principles of the invention. As earlier mentioned, the principles of the invention can be applied to a through type fastener element, having either a through clearance or a through threaded type opening. The depth of the spacing between the end flange and disk may vary, so that the space increases in depth somewhat from the top down.

The illustrated embodiments are presented for example purposes. The description of these embodiments is not to define or limit the scope of the invention. Rather, the scope of the invention is to be determined solely by an interpretation of the claims, applying the established rules of patent claim interpretation, including the doctrine of equivalents.

What is claimed is:

1. For molded-in installation by use of a potting resin, into a cavity formed in a sandwich panel of composite material, inwardly of a skin opening that is smaller in diameter than the cavity, a fastener element including a portion to which a screw fastener or the like is secured for in that manner connecting an object to the panel, said fastener element further comprising:

an outer end disk sized to be snugly received within the skin opening;

a circular stem extending inwardly from the outer end disk, said stem being substantially smaller in diameter than the outer end disk;

a plurality of axially spaced apart flow control disks on the stem, defining flow passageways around the stem axially between adjoining flow control disks and axially between the outer end disk and an adjacent flow control disk, each flow control disk having an axial dimension which is substantially smaller than the stem diameter in said flow passageways;

each said flow control disk having flat chord surfaces on diametrically opposite sides of the fastener element, and, circumferentially between the chord surfaces, being circular and of a diameter substantially equal to the diameter of the outer end disk;

wherein when the fastener element is positioned within the cavity with the outer end disk within the skin opening, first and second cavity spaces exist on opposite sides of the fastener element, laterally outwardly from the chard regions of the fastener element;

said outer end disk having a fill opening which is in substantial alignment with said cavity space on a first side of the fastener element;

said outer end disk having a vent opening diametrically across the fastener element from the fill opening, and in substantial alignment with the cavity space on the second side of the fastener element; and said fastener element being constructed from a resin material to which the potting resin will make a cohesive bond;

whereby when potting resin is injected through the fill opening it will first flow into the first cavity space, and then around the fastener element, including through the flow passageways and around the stem, to the second cavity space, and then axially through said second cavity space to the vent opening.

2. A fastener element according to claim 1, constructed from a poly (amide-imide) resin.

3. A fastener element according to claim 1, wherein the flow control disks include inward side surfaces which slope axially outwardly as they extend radially outwardly, so that the passageways between the flow control disks are larger in cross-section than the passageway defined between the end disk and the adjoining flow control disk.

4. For molded-in installation, by use of a potting resin, into a cavity formed in a sandwich panel of composite material, inwardly of a skin which includes an opening that is smaller in diameter than the cavity, a fastener element insertable into the cavity through said opening and including a portion to which a screw fastener or the like is secured for in that manner connecting an object to the panel, said fastener element further comprising:

an outer end disk sized to be snugly received within the skin opening;

a steam extending inwardly from the outer end disk, said stem being substantially smaller in diameter than the outer end disk;

flow control surface portions of said stem having boundaries on diametrically opposite sides of the fastener element so positioned that when the fastener element is within the cavity there are distinct cavity spaces defined laterally outwardly from said boundaries;

said outer end disk having a fill opening which is in substantial alignment with a first said cavity space on a first side of the fastener element;

said outer end disk having a vent opening diametrically across the fastener element from the fill opening, and in substantial alignment with the second cavity space on the second side of the fastener element;

said flow control surface portions functioning to cause potting resin which is injected through the fill opening to first flow into the first cavity space, and then from such space substantially uniformly around the fastener element to the second cavity space, and then axially through the second cavity space to the vent opening; and said fastener element being constructed from a resin material to which the potting resin will make a cohesive bond.

5. A fastener element according to claim 4, comprising a plurality of flow control disks on the stem, defining flow passageways around the steam axially between adjoining flow control disks and axially between the outer end disk and an adjacent flow control disk, each said flow control disk having boundary surfaces defining the boundaries on the diametrically opposite sides of the fastener element.

6. A fastener element according to claim 5, molded from a poly (amide-imide) resin.

7. A fastener element according to claim 4, comprising a helical flow control rib on the stem, defining flow passageways around the stem between turns of the flow control rib, said flow control rib having boundary surfaces on diametrically opposite sides of the fastener element defining said opposite side boundaries of the fastener element.

8. A fastener element according to claim 7, wherein each turn of said rib has an axial dimension substantially smaller than the stem diameter, said boundary surfaces include flat chord surfaces, and said flow control rib has regions circumferentially between said chord surfaces having a diameter substantially equal to the diameter of the outer end disk.

9. A fastener element according to claim 8, molded from a poly (amide-imide) resin.

* * * * *

UNITED STATES PATENT AND TRADEMARK OFFICE
CERTIFICATE OF CORRECTION

PATENT NO. : 4,902,180
DATED : February 20, 1990
INVENTOR(S) : Richard F. Gauron It is certified that error appears in the above-identified patent and that said Letters Patent is hereby corrected as shown below:

In Fig. 16, "94" should be -- 93 --, and "96" should be -- 95 --.
Col. 1, line 31, there should be a period after "material".
Col. 1, line 60, after "are", insert -- defined --.
Col. 1, lines 60, 61, "disk and between the outer end disk and the flow control" should be deleted.
Col. 1, line 62, after "The", insert -- flow control --.
Col. 2, line 14, delete "rib".
Col. 2, line 23, "provided" should be -- provide --.

UNITED STATES PATENT AND TRADEMARK OFFICE
CERTIFICATE OF CORRECTION

PATENT NO. : 4,902,180
DATED : February 20, 1990
INVENTOR(S) : Richard F. Gauron It is certified that error appears in the above-identified patent and that said Letters Patent is hereby corrected as shown below:

Col. 2, line 31, "disk" should be -- disks --.
Col. 2, line 54, "fOr" shouls be -- for --.
Col. 3, line 5, "Fig.", second occurrence, should be -- Figs. --.
Col. 3, line 10, before "fastener", insert -- a --.
Col. 3, line 26, "fastener" should be -- a fastener element --.
Col. 3, line 29, before "fastener", insert -- a --.
Col. 3, line 45, before "several", insert -- in --.
Col. 3, line 50, after "14", insert -- 16 --.
Col. 3, line 53, "14, 6" should be -- 14, 16 --.
Col. 3, line 54, "It is known.." begins a new paragraph.
Col. 4, line 36, "Fig." should be -- Figs. --.
Col. 5, line 2, there should be a period after "insert".
Col. 5, line 62, "stem 68" should be -- stem 76 --.
Col. 6, line 8, following "Vent opening", insert -- 96 --.
Col. 6, line 54, "elements, 70" should be -- element 70 --.
Col. 7, line 8, "disks 80" should be - disk 80 --.
Col. 7, line 10, "is" should be -- are --.
Col. 7, line 23, "at" should be -- as --.
Col. 7, line 44, "22, 124" should be -- 122, 124 --.
Col. 7, line 45, "disk" should be -- disks --.
Col. 7, line 51, there should be a period after "element 120".

UNITED STATES PATENT AND TRADEMARK OFFICE
CERTIFICATE OF CORRECTION

PATENT NO. : 4,902,180
DATED : February 20, 1990
INVENTOR(S) : Richard F. Gauron It is certified that error appears in the above-identified patent and that said Letters Patent is hereby corrected as shown below:

Col. 7, line 60, "disk" should be -- disks --.

Claim 1, col. 8, line 31, "chard" should be -- chord --.

Claim 4, col. 9, line 3, "steam" should be -- stem --.

Claim 5, col. 10, line 6, "steam" should be -- stem --.

Signed and Sealed this

Tenth Day of December, 1991

Attest:

HARRY F. MANBECK, JR.

*Attesting Officer*  *Commissioner of Patents and Trademarks*

UNITED STATES PATENT AND TRADEMARK OFFICE
CERTIFICATE OF CORRECTION

PATENT NO. : 4,902,180

DATED : February 20, 1990

INVENTOR(S) : Richard F. Gauron

It is certified that error appears in the above-identified patent and that said Letters Patent is hereby corrected as shown below:

On the title page, under FOREIGN PATENT DOCUMENTS, Swiss Patent No. 242,889 and German Patent No. 2,828,438 should be added.

In Fig. 16, "94" should be -- 93 --, and "96" should be -- 95 --.

Col. 1, line 31, there should be a period after "material".

Col. 1, line 60, after "are", insert -- defined --.

Col. 1, lines 60, 61, "disk and between the outer end disk and the flow control" should be deleted.

Col. 1, line 62, after "The", insert -- flow control --.

Col. 2, line 14, delete "rib".

Col. 2, line 23, "provided" should be -- provide --.

UNITED STATES PATENT AND TRADEMARK OFFICE
CERTIFICATE OF CORRECTION

PATENT NO. : 4,902,180

DATED : February 20, 1990

INVENTOR(S) : Richard F. Gauron

It is certified that error appears in the above-identified patent and that said Letters Patent is hereby corrected as shown below:

Col. 2, line 31, "disk" should be -- disks --.

Col. 2, line 54, "fOr" shouls be -- for --.

Col. 3, line 5, "Fig.", second occurrence, should be -- Figs. --.

Col. 3, line 10, before "fastener", insert -- a --.

Col. 3, line 26, "fastener" should be -- a fastener element --.

Col. 3, line 29, before "fastener", insert -- a --.

Col. 3, line 45, before "several", insert -- in --.

Col. 3, line 50, after "14", insert -- 16 --.

Col. 3, line 53, "14, 6" should be -- 14, 16 --.

Col. 3, line 54, "It is known.." begins a new paragraph.

Col. 4, line 36, "Fig." should be -- Figs. --.

Col. 5, line 2, there should be a period after "insert".

Col. 5, line 62, "stem 68" should be -- stem 76 --.

Col. 6, line 8, following "Vent opening", insert -- 96 --.

Col. 6, line 54, "elements, 70" should be -- element 70 --.

Col. 7, line 8, "disks 80" should be - disk 80 --.

Col. 7, line 10, "is" should be -- are --.

Col. 7, line 23, "at" should be -- as --.

Col. 7, line 44, "22, 124" should be -- 122, 124 --.

Col. 7, line 45, "disk" should be -- disks --.

Col. 7, line 51, there should be a period after "element 120".

UNITED STATES PATENT AND TRADEMARK OFFICE
CERTIFICATE OF CORRECTION

PATENT NO. : 4,902,180
DATED : February 20, 1990
INVENTOR(S) : Richard F. Gauron It is certified that error appears in the above-identified patent and that said Letters Patent is hereby corrected as shown below:

Col. 7, line 60, "disk" should be -- disks --.
Claim 1, col. 8, line 31, "chard" should be -- chord --.
Claim 4, col. 9, line 3, "steam" should be -- stem --.
Claim 5, col. 10, line 6, "steam" should be -- stem --.

This certificate supersedes Certificate of Correction issued December 10, 1991.

Signed and Sealed this

Eighth Day of September, 1992

*Attest:*

DOUGLAS B. COMER

*Attesting Officer*  *Acting Commissioner of Patents and Trademarks*